INVENTOR
Robert C. Wincklhofer
Gene C. Weedon
Robin B. Mumford

BY

Roy H. Massengill
ATTORNEY

United States Patent Office 3,623,928
Patented Nov. 30, 1971

3,623,928
SELF-BONDED FILAMENT WOUND ARTICLE AND PROCESS FOR MAKING SAME
Robert C. Wincklhofer and Gene C. Weedon, Richmond, Va., and Robin B. Mumford, Middletown, N.J., assignors to Allied Chemical Corporation, New York, N.Y.
Filed Mar. 11, 1969, Ser. No. 806,172
Int. Cl. B31c 1/00, 13/00
U.S. Cl. 156—175                    7 Claims

ABSTRACT OF THE DISCLOSURE

The article is manufactured by winding a filament composed of polymers wherein one polymer is dispersed as fibrils in a lower melting point polymeric matrix onto a mandrel followed by bonding of the filaments together through heating them to a temperature above the melting point of the matrix-forming polymer but below the melting point of the dispersed fibrils and permitting them to both self-bond and self-compact due to shrinkage thereof.

BACKGROUND OF THE INVENTION

(1) Field of the invention

The present invention relates to an article and the method for making it through the use of a multi-constituent filament wound onto a mandrel and subsequently heated to cause a self-bonding and self-consolidation of the filaments. Preferably the filaments have a nylon matrix with microfibers of polyester dispersed therein and the heat is applied at such a temperature that the nylon matrix begins to fuse but the polyester with its higher melting point does not. These filaments (described and claimed in Twilley U.S. Pat. 3,369,057 which patent is hereby incorporated by reference as if fully set out herein) were originally prepared for employment in high-strength yarns useful in yarn or cord form as reinforcing strands in elastomeric tires and the like. In particular, when used to reinforce tires, the Twilley filaments have a higher tensile modulus than do normal polyamide filaments from the same polyamide and significantly lower cured strength loss, thereby producing stronger and more durable tires with much less undesirable flat spotting.

(2) Description of the prior art

The use of circumferential wrappings or filament winding to manufacture articles has been used for many years heretofore. It was and has been primarily used to gain the maximum utilization of the potential structural properties of the filament material used to make up the article. Wire wrappings have been used to prevent bursting of cannon barrels and to wrap wooden pipes both to increase the bursting strength and to hold the two parts together so that a leak-proof cylinder is formed. The use of filamentary structures and applications requiring ultimate structural performance has, however, only been highly developed in recent years. At the present time its practice is almost exclusively a fabrication technique for forming glass filaments bound together by a resin matrix. The glass is usually in the form of continuous filaments, roving, yarn or tape and is either coated immediately before winding by a suitable resin (wet process) or impregnated by the resin ahead of time (pre-impregnated process). After the structure has been wound on a mandrel whose shape corresponds to the inner structure of the part being fabricated, the resin is subsequently cured to hold the reinforcing filaments in place, seal them from mechanical damage and protect them from environmental deterioration.

Heretofore, practically all filament windings have been conducted using glass as a filamentary material. Other materials which have been used include quartz, asbestos, ceramics and metals.

In most all of prior commercial filament winding, the filament material forms the reinforcement and load bearing function of the structure and the resin forms the bonding matrix.

SUMMARY OF THE INVENTION

In accordance with the present invention unique new articles are formed of multi-constituent filaments having wide-spread useful value for such items as pipe, masts, antenna, flagpoles, conduits and so forth. These and other items are readily formed using highly developed filament winding practices and machinery modified to accommodate the special characteristics of the unique poly-constituent materials and the unique steps used in the invention. These multi-constituent materials have a matrix containing a dispersion of discontinuous microfibers or fibrils with a substantially higher melting point than the polymer matrix in which they are present. Upon heating to the melting point of the matrix these polymers will shrink and autogenously weld to one another.

Although various polymers are mixed together in this invention, they are not entirely intermiscible due to their physical properties and/or the mixing technique employed to assure a dispersion of microfibers. Microsized globules or fibrils are usually initially produced in the matrix which when spun and drawn produces the desired microfibrillar dispersion in the lower melting matrix material.

In accordance with this invention, it has been discovered that a layer composed of filaments of the type described in the U.S. Pat. 3,369,057 may be wound on a mandrel of desired shape and then heated above the melting point of the matrix but below the melting point of the fibrils whereby the filaments shrink applying great inward pressure which serves to draw them close together and simultaneously self-bond or autogenously bond them one to the other. An important feature of this invention is that a microfiber dispersion is intentionally created and preserved throughout the filament winding and treatment phases of article production which article is produced without having to utilize any additional material to form a bonding matrix to join the filaments together. It was further discovered that various other polymer blend systems having at least two polymers of varying melting temperatures, one polymer being dispersed as discontinuous fibrils in a matrix of the other, can be employed to produce filament-wound articles and although nylon-polyester blends of the type mentioned in the Twilley patent provide the best results, other blend systems as will be described will be embraced by and included in this invention. The principal objects of this invention are, therefore, to provide novel filament-wound articles and the methods of producing the same, without limitation to specific shapes or forms.

As used herein these terms are intended to have the following meaning:

Multi-constituent filaments—filaments made by inclusion of at least one polymeric material in a matrix of another as discontinuous fibrils, the two materials having substantially different melt temperatures such that fibrous constructions wound thereof can be autogenously bonded by application of heat below the melt temperature of one and equal to or above that of the other, the entire filament composition or any component thereof optionally including any secondary material compatible with the article as a whole such as antioxidants and other stabilizing agents, fillers, fluorescent materials, dispersing agents, and others useful in polymerization, extruding, spinning, setting and product finishing techniques. If desired, inorganic materials such as metal whiskers and the like may be incorporated for conductive and/or other purposes.

Filament winding—includes winding onto a mandrel shaped to the desired configuration of the wound article, multi-constituent filaments followed by the heating of the wound filaments to a temperature whereby the lower melting point matrix is at or above the temperature of fusion so that the filaments will shrink and bond together but this temperature is maintained below the fusion point of the discontinuous fibrils. The filament material when wound onto the mandrel may be in the form of individual filaments, yarn or tape made by weaving, knitting or nonwoven techniques. However, the material used to do the winding whether individual filaments, yarn or tape must be of sufficient continuous length to permit the filament winding to be carried out without substantial interruption.

In general, the invention is applicable to filament-wound articles prepared from multi-constituent filaments or yarn or tape of any combination of polymeric materials capable of creating a matrix and having a relatively higher melting dispersion of discontinuous fibrils. However, it is clear that a polyesterpolyamide combination produces outstanding articles over the other materials. These compositions may contain 50–90 parts by weight nylon and 50–10 parts by weight polyester dispersion. Other materials useful in multi-constituent fibers are polyolefins, polysulfones, polyphenyl oxides, polycarbonates, and other polyamides and polyesters. In any combination of any of the foregoing, the higher melting material is dispersed in the form of fibrils in a matrix of the other. In all of the blends mentioned hereinafter, heat-setting and improved shape stability was achieved. Examples of the most useful polyolefin materials are polyethylene, polypropylene, poly-1-butene, polyisobutylene and polystyrene. In addition to the preferred nylon 6 (polycaproamide), other suitable polyamides are nylon 6–10 (hexamethylene, diamine, sebacic acid), nylon 6–6 (hexamethylene-diamine-adipic acid), methanol- and ethanol-soluble polyamide copolymers and other substituted polyamides such as the alkoxy-substituted polyamides. The preferred polyester is polyethylene terephthalate; others are polyesters of high $T_G$ useful in the practice of the present invention, including those polymers in which one of the recurring units in the polyester chain is the diacyl aromatic radical from terephthalic acid, isophthalic acid, 5-t-butylisophthalate, a naphthalene dicarboxylic acid such as naphthalene 2,6 and 2,7 acids, a diphenyldicarboxylic acid, a diphenyl ether dicarboxylic acid, a diphenyl alkylene dicarboxylic acid, a diphenyl sulphone dicarboxylic acid, an azo dibenzoid acid, a pyridine dicarboxylic acid, a quinoline dicarboxylic acid, and analgous aromatic species including the sulfonic acid analogues; diacyl radicals containing cyclopentane or cyclohexane rings between the acyl groups; and such radicals substituted in the ring, i.e., by alkyl or halo substitutes.

The filament winding technique in accordance with this invention can also provide an intermediate tube which is of sufficient flexibility to be shipped in a flat form and once placed on the job site can be heated by passing a heated fluid therethrough which will expand it and at the same time cause the individual filaments to bond together into a semi-rigid structure. Still further, the mandrel upon which the material is wound can have a configuration or surface texture such as that of the helix to provide an interior surface of special form.

Many objects and advantages of the present invention will become apparent from the following description taken in conjunction with the accompanying drawings.

DESCRIPTION OF THE INVENTION

Figure 1:
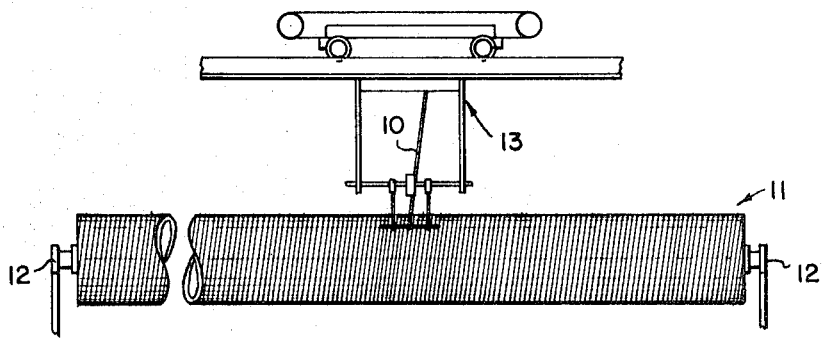
FIG. 1 shows a schematic view of a typical filament winding apparatus.

As a first example of the practice of this invention multi-constituent filament is produced in accordance with the formulation of Example 1 in U.S. Pat. 3,369,057, i.e., granular polyethylene terephthalate polymer was used, melting about 255° C. (DTA) and about 265° C. (optical), having density (when amorphous) of about 1.33 grams per cc. at 23° C. and about 1.38 grams per cc. in the form of drawn filament, having reduced viscosity of about 0.85 and having $T_G$ about 65° C. The polyester in the form of drawn filament drawn to give ultimate elongation not above 20 percent will have tensile modulus (modulus of elasticity) ranging from about 70 to about 140 grams per denier, depending on spinning conditions employed.

This polyester (30 parts) was mixed with 70 parts of granular polycaproamide having reduced viscosity about 1.04, $T_G$ about 35° C. and density about 1.14 grams per cc. at 23° C. Amine groups in this polycaproamide had been blocked by reaction with sebacic acid, bringing the amine group analyses thereof to 11 milliequivalents of $NH_2$ groups per kilogram of polymer. This polycaproamide contained as heat stabilizer 50 p.p.m. copper as cupric acetate.

The mixture of polyamide and polyester granules was blended in a double cone blender for 1 hour. The granular blend was dried to a moisture content of no more than 0.01 percent then melted at 285° C. in a 3½ inch diameter screw extruder operated at a rotational speed of about 39 r.p.m. to produce a pressure of 3000 p.s.i.g. at the outlet. A dry nitrogen atmosphere was used to protect the blend against absorbing moisture. Residence time in the extruder was 8 minutes.

The molten mixture thereby obtained had melt viscosity of about 2000 poises at 285° C. The polyester was uniformly distributed throughout and had average particle diameter of about 2 microns, as observed by cooling and solidifying a sample of the melt, leaching out the polyamide component with formic acid and examining the residual polyester material.

The multi-constituent blend thus produced was extruded through a spinnerete plate and the resulting solidified fibers were drawn and wound at 1000–2000 feet per minute under tensions of about .01 gram per denier. The filaments were then drawn 4 to 6 times their length in order to impart orientation and maximum strength thereto. The fibers were then formed into a yarn denier of 840 grams per 9000 meters. This 840 denier yarn was made up of 136 individual fibers.

The yarn was then wound using a standard textile winder onto a cardboard pirn one-half inch thick which was overlaid with aluminum foil. The winding tension was just sufficient to apply a firm wrap. After being wound to ⅛ inch depth, the cardboard pirn and wrap were removed from the winder and suspended in a forced-draft oven one hour at 240° C. After removing from the oven, the cardboard pirn was cut away and it was found that the filament-wrapped material was fused, round and shiny inside and out. The color of the outside was greenish-brown and inside was off white and gray-brown. The cylinder thus formed was stiff, strong and flexible and was found to have a strength in the direction of winding of 31,200 p.s.i. and axially of 12,250 p.s.i. This compared with molded nylon-6 which has a tensile strength of about 10,000 to 12,000 p.s.i.

As a second example, with specific reference to FIG. 1 of the drawings, the filament 10 of the same 840/136 yarn used above is wound onto a collapsible mandrel 11 held in mandrel supports 12. As the mandrel is rotated by a power source (not shown), a traversing mechanism 13 travels back and forth feeding the filament 10 to the rotating mandrel and building up the thickness of the wound filament to that desired for the article being produced.

The apparatus shown in FIG. 1 in highly schematic form is representative of one circular type of winding machine which simulates the operation of the lathe. In the lathe-type machine helical winding patterns ranging from 5 to 85 degrees can be accurately positioned. Circumferential windings can be included with the helical windings.

A number of other winding machines are presently used in filament winding, some of a rectangular type, some with the mandrel axis in a vertical position, some with a race-track type of arrangement where the mandrel is stationary and the filament feeding mechanism runs on a a track around the mandrel, and still others with the capability of winding spheres and the like.

The mandrel can be of several types, such as a collapsible mandrel made of aluminum or other metals as well as plastic or ceramics. It should be solid, collapsible, or made with a material which can easily be removed. The choice of material depends largely on subsequent methods of removing the filament-wound structure. The mandrels generally require a smooth surface with sufficient strength to permit winding and adaptability to the type of machine being used. In one example subsequent hereto, a non-smooth surface is utilized, but generally the surface should be smooth.

The principal materials used to fabricate the mandrels are knock-down or collapsible mandrels, inflatable mandrels, soluble or meltable salts, soluble or meltable plastics, aggregates with soluble or meltable binders, mechanical break-out plasticizers and combinations of soluble or meltable materials with a collapsible mandrel. The segmented or collapsible mandrels are preferred and have been frequently used in filament winding. They are especially desirable when the repetitious production is involved; however, with large diameter products which are expensive and expected to be produced in only single numbers or small quantities, it is possible that the mandrels could cost more than the finished filament-wound article. Under these circumstances mandrels which are destroyed after the winding may be utilized. However, in spite of the wide choice for mandrels, it is preferred that an aluminum one be used since its coefficient of thermal expansion under the temperature treatment steps, which will be mentioned subsequently, is such that upon cooling it will shrink sufficiently to permit a more ready removal of the filament-wound article.

Another filament winding technique which is not shown in the drawings but is well known in the art and useful for carrying out the invention is that of continuous winding whereby a tube is continuously fed from the winding apparatus and rolled up or cut to a desired length.

The winding tension on filament 10 is preferably just sufficient to cause it to form a firm belt and further winding is stopped after a desired thickness is arrived at which in this example is ½ inch.

Figure 2:
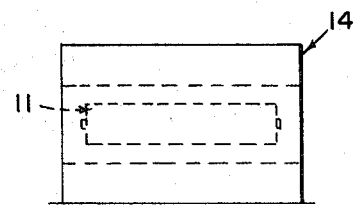
FIG. 2 shows in schematic form a mandrel with the filament material thereon being heated in a furnace.

The wound mandrel with the ½ inch deep layer of filament was then removed from the apparatus and placed in the furnace 14 of FIG. 2 and was left there for one hour at 240° C. The temperature may have been varied between about 200° C. but below 260° C., so long as it is above the melting point of the matrix-forming polymer but below the melting point of the dispersed fibrils. Following removal from the furnace, the mandrel and now bonded filaments, which have been autogenously fused to one another by the fusing step, are permitted to cool in ambient air. After cooling, the mandrel is placed on a lathe and the exterior of the filament-wound tube was ground to a smooth surface finish and one end had male threads cut thereupon. The collapsible aluminum mandrel was then removed and the smooth threaded tube was screwed into a mating female threaded tube made by the same technique. The tube was quite strong, rigid and attractive. The grinding and threading technique showed the ready machinability of the fused material and its capability for producing numerous commercial articles.

Although the filaments were wound substantially in a circumferential direction with only a relatively small pitch to the helix, it is understood that the direction of the filaments should preferably be in the direction to which the principal stresses will be applied, for example, circumferential winding would be best for hoop stresses, whereas a more longitudinal winding would be superior when transverse stresses are to be expected.

Figure 4:
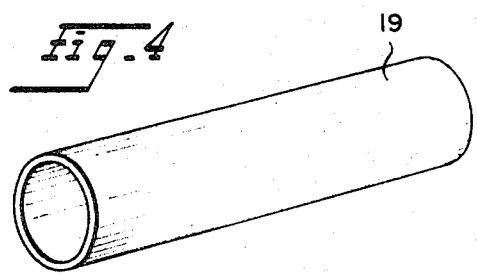
FIG. 4 shows a tube formed in accordance with the practice of this invention having a smooth interior surface.

Tube 19 after being ground but without threads is shown in FIG. 4 as produced by the second example.

Figure 3:
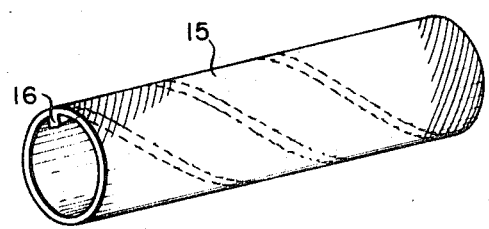
FIG. 3 shows a tube formed in accordance with the practice of this invention which has a helical ridge on the interior thereof.

As a third example, the second example was repeated except the collapsible mandrel had a helical groove extending therearound so that the wound and fused article after being removed from the collapsed mandrel is in the form of a tube 15 as shown in FIG. 3 with a helical ridge 16 extending therein. The ridge 16 is exaggerated in FIG. 3 for purposes of illustration and in actual practice is only approximately $\frac{1}{16}$-inch thick on a half-inch thick tube 3 inches in outside diameter.

Although only one helical ridge is shown in FIG. 3, it can be appreciated that a number of ridges would be formed and these are found of value in causing liquid flowing therethrough to flow in a whirlpool or corkscrew pattern. This is of value when it is desired that the liquid be efficiently mixed and is especially useful when the liquid is highly viscous or laden with solid particles. The spiral flow builds up a centrifugal force that acts to spin the liquid away from the center. Under the influence of this centrifugal force, however, the liquid flow is bounced off the pipe wall and driven back toward the center. This interaction of forces causes a thorough mixing of liquid, giving any solid particles in the liquid no time to settle at the bottom of the tube.

Why the third example above can produce such an interesting interior shape upon being bonded and fused is due to the nature of the process. Upon heating to the temperatures indicated, the fibers shrink and exert a tensile force of about one pound per bundle in the case of the 840/136 filament being utilized. The tremendous inward pressure causes the tube to take the shape of the mandrel including shallow recesses therein as well as enhancing the density of the finished article and bonding efficiency of the heating step. Obviously configurations other than the helical one may be provided to the interior surface of the article by the mandrel.

Figure 5:
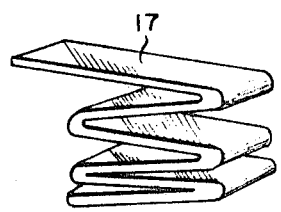
FIG. 5 shows a tube which has been removed from the mandrel and collapsed and folded.
Figure 6:
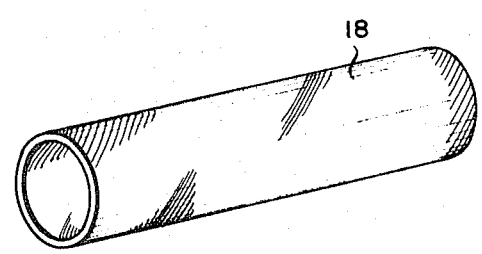
FIG. 6 shows the tube for FIG. 5 after it has been inflated and heated.

As a fourth example, the second example was repeated except the wound filament was passed through an oven at a high temperature heated by radiant heaters having a temperature such that they glowed red. The wound filament passed approximately one inch from the surface of the radiant heaters at a sufficiently slow speed to cause incipient fusing and bonding of the outside skin but insufficient to cause a substantial fusion and bonding. The amount of time for exposure to this glow-red temperature is judged under the particular circumstances and can be readily ascertained by observing the filament-wound structure. After the partial fusing and bonding of the exterior skin, the mandrel and found filament are immediately removed from the heat source and cooled by a blast of air held at room temperature. The mandrel is then collapsed and removed and the very flexible tube is flattened and folded into the shape 17 shown in FIG. 5. It is then readily transported with a minimum of difficulty due to its compact shape to a job site where it is placed in the position desired for a conduit in a building structure or pipeline. The end of the tube is restricted by placing a plug therein, which in the case of a 3-inch diameter would have a half-inch orifice, and the other end would have heated air applied thereto under sufficient pressure, approximately 5 p.s.i., to cause the tube to inflate to cylindrical form. The air is heated to sufficient temperature that it will raise the tube to between 200 and 250° C. to complete the fusing and bonding of the tube. Since the air is losing its heat to the walls of the conduit, the half-inch hole is provided at the far end to permit it to escape so that a continuous flow of hot air can be introduced into the tube and at the same time sufficient pressure built up to cause an inflation thereof.

As a fifth example, the first example was repeated but the sample was fused for only 30 minutes at 250° C. The fusion was complete and the sample was satisfactory in all respects.

As a sixth example, the fifth example was repeated but the time in the furnace was 75 minutes. The sample was again satisfactory in all respects. It was dark shiny on the outside and cream shiny on the inside.

As a seventh example, the sixth example was again duplicated but on a thin metal mandrel. When heated in a hot air oven for 15 minutes at 250° C. the thin metal mandrel was collapsed and the diameter of the sample shrank to approximately one-half of its original size. It was fully fused, however, and was hard, tough and slightly flexible. This example pointed up the need for a rigid mandrel to provide adequate support for the pressures created by the shrinkage of the filament. When this example was repeated with more adequate support for the thin metal mandrel the sample was again completely satisfactory but maintained the size of the mandrel rather than the smaller size resulting from the collapse thereof.

As an eighth example of a blend of two different materials in the same general class as carried out in the above examples, a blend was prepared consisting of 30% polyethylene and 70% polypropylene by weight. Both resins were commercially available grades. The blend was spun using a one-inch extruder having a 24 to 1 $L/D$ ratio. The spinning temperatures were 280 to 290° C. A 20-hole spinnerette having a 0.020 mil diameter capillary with an $L/D$ ratio of 10 to 1, and a 20 degree entrance angle was used. After spinning and drawing, the filament was prepared in accordance with the principles outlined above and wound into a desired shape, except the temperature of fusing and bonding should be below about 180° C.

In addition, still other blends are satisfactory for purposes of this invention, including those disclosed in U.S. Pats. Nos. 3,378,055, 3,378,056 and 3,378,602; British Pat. No. 1,097,068; Belgian Pat. No. 702,803; and Dutch Pat. No. 6606838.

As a ninth example, a ribbon of 840 denier/136 filament yarn was formed using the biconstituent composition cited in Example 1. The ribbon was manufactured on a conventional needle loom using a plain weave design of 40 warp ends and 40 filling picks/inch of the 840 denier yarn. The woven ribbon had a nominal width of one inch. The ribbon was subsequently wound onto an aluminum cylinder at such an angle so that the spacing between each spiral wrap was 3/8 inch and the angle measured from the long axis of the cylinder was 50 degrees. The ribbon was wound in a traversing fashion back and forth across the central aluminum shape until 15 layers of ribbon were wrapped about the core. The assembly was cured for one hour at 250° C., cooled to room temperature and the fused ribbon was removed from the core. The resulting article was a rigid, tough, and cohesive tube.

As a tenth example, a biconstituent yarn of 70 weight percent nylon 6 and 30 weight percent of polyethylene terephthalate of 1125 denier/70 filament was wrapped about an aluminum form in the shape of a rectangle having a one inch square cross section and 24 inches long. The yarn was wound at a 30 degree angle with 1/4 inch between successive wraps to a depth of 3/4 inch. The wound assembly was cured for 90 minutes at 245° C. in an oven and allowed to cool slowly. The aluminum core was removed and a fused, rectangular object of light weight suitable for use as a support member was obtained. Alternatively, the hollow article could be filled with a rigid foam for additional strength.

The purpose of the last two examples is to demonstrate that the filaments may be wound around a form having any desired shape and the wound material may be a ribbon or strand composed of the multiconstituent filaments useful in the present invention. Thus, the multiconstituent materials employed in this invention may be wound upon a form having any desired shape as single filaments, multifilament strands comprised of continuous filaments or staple fibers, or widths of woven or nonwoven material formed therefrom. Also, multiconstituent wrapped or plied yarns may be employed.

For any given multi-constituent formulation, the temperature and time and winding tension will vary depending on the polymeric materials, article size, shape, mode of heat application and other variables. In general, it is necessary to apply heat without excessive degradation of the filament material with sufficient intensity and duration until the filaments have fused to each other. If the filaments are spun from polyblend staple fibers which may be employed in the practice of this invention, the fibers forming said yarn will fuse together individually in addition to fusion at the cross points of said fabric.

The invention may be embodied in other specific forms without departing from the spirit or essential characteristics thereof. The present embodiments are therefore to be considered in all respects as illustrative and not restrictive, the scope of the invention being indicated by the appendant claims rather than by the foregoing description, and all changes which come within the meaning and range of equivalency of the claims are therefore intended to be embraced therein.

What is claimed is:

1. The method of making a self-bonded filament-wound article by:
    taking a strand of filament material containing multi-constituent filaments consisting of a first polymer matrix having a first melting point and discontinuous fibrils of a second polymer dispersed in said first polymer matrix and having a melting point higher than that of said first polymer;
    winding said strand about a shaped form to a desired thickness; and
    heating said wound strands to a temperature above the fusion point of said first polymer and below the fusion point of said second polymer, so as to cause self-bonding of said multi-constituent filaments.

2. The method of claim 1 wherein the multi-constituent fiber is composed of a polycaproamide matrix and polyethylene terephthalate fibrils with the heating temperature being between about 200° C. and about 260° C.

3. The method of claim 1 wherein the wound strands are cooled and then machined to a desired configuration.

4. The method of claim 1 wherein the shaped form is a mandrel.

5. The method of claim 4 wherein the heating is carried out with sufficient intensity to cause only partial fusion of said wound strands followed by removal of the mandrel, flattening of the partially fused wound strands to provide a flattened structure and subsequent inflation of said flattened structure by a heated fluid at a temperature sufficient to complete the self-bonding and stiffening of said structure.

6. The method of claim 4 wherein the mandrel has an exterior surface configuration which is imparted to the interior surface of said wound filaments by the heating step.

7. The method of claim 4 wherein the mandrel has an exterior surface configuration in the shape of one or more helical grooves so that one or more helical ridges are imparted to the interior surface of said wound filaments by the heating step.

References Cited

UNITED STATES PATENTS

| | | | |
|---|---|---|---|
| 2,757,150 | 7/1956 | Heritage | 156—497 |
| 3,154,107 | 10/1964 | Vanderbilt | 156—175 X |
| 3,231,442 | 1/1966 | Michael | 156—175 X |
| 3,369,057 | 2/1968 | Twilley | 156—110 X |
| 3,378,602 | 4/1968 | Robertson | 156—110 X |

CARL D. QUARFORTH, Primary Examiner

E. E. LEHMANN, Assistant Examiner

U.S. Cl. X.R.

138—129, 141; 156—156, 180, 198, 285, 306, 327